United States Patent [19]

Power

[11] 4,176,591
[45] Dec. 4, 1979

[54] COOKING PAN FOR BAKING PIZZA PIES AND LIKE FOOD PRODUCTS

[76] Inventor: Douglas P. Power, 1131 N. Westgate, Springfield, Mo. 65802

[21] Appl. No.: 894,744

[22] Filed: Apr. 10, 1978

[51] Int. Cl.$^2$ .................... A21B 3/13; A47J 27/00; A47J 36/00
[52] U.S. Cl. ..................... 99/430; 99/450; 99/DIG. 15
[58] Field of Search ................ 99/430, 450, DIG. 15

[56] References Cited

U.S. PATENT DOCUMENTS

| 114,444 | 5/1871 | Jones | 99/450 |
|---|---|---|---|
| 254,770 | 3/1882 | Hurd | 99/450 |
| 987,525 | 3/1911 | Wing | 99/DIG. 15 |
| 1,316,365 | 9/1919 | Jackson | 99/450 |
| 3,347,181 | 10/1967 | Pizzo | 99/450 X |

*Primary Examiner*—Stanley N. Gilreath
*Attorney, Agent, or Firm*—Charles B. Haverstock

[57] ABSTRACT

An improved one piece cooking pan designed especially for use in baking pizza pies or like food products in a pre-heated oven, the pan having a substantially flat bottom portion with a plurality of perforations uniformly distributed over the entire extent thereof for directly exposing a substantial portion of the lower dough layer of a pizza pie or the like food product to the cooking heat of the oven. The perforations preferably have filleted upper edge portions and are uniformly distributed over the pan surface such that the ratio of the perforated surface area of the bottom portion of the cooking pan to the total surface area thereof is in the range from approximately 15 to 40 percent. The filleted upper edge portion of each perforation allows the heat to be distributed relatively more uniformly over the exposed areas of the product being cooked and avoids undesireable concentration of the cooking heat. The uniform distribution pattern of the perforations also produces a rapid elimination of moisture in the dough, substantially reduces the separation and bubbling effect of the dough, shortens the cooking time, and makes it easier to separate the cooked product from the pan. This specific relationship between filleted perforations and the ratio of the perforated surface area of the bottom portion of the pan to the total surface area thereof produces an accumulative affect which results in considerable cooking advantages and energy savings over prior art constructions. The substantially flat bottom portion of the pan preferably also has a centrally disposed aperture therein as an aid to proper positioning of the pan on a device used for punching the perforations therethrough. The pan construction of the present invention has wide applications for use in oven cooking food products such as pizza and other type pie products, cookies and numerous other food products.

6 Claims, 6 Drawing Figures

COOKING PAN FOR BAKING PIZZA PIES AND LIKE FOOD PRODUCTS

At the present time, there are basically two commercial methods for oven cooking pizza type products. One of these methods is commonly known as the "corn meal" method, wherein raw pizza products are prepared on boards covered with particles of corn meal or some like material so that they can be slid off the board onto similar particles distributed on the cooking surface of pre-heated oven stones. The other method widely used today is the "pan" method wherein prior to entry into the oven the raw pizza products are prepared and placed onto metal pan members which are usually circular in shape and have peripheral flanges to facilitate cutting the pizza dough to the size and shape of the pan. The pan members used for this purpose are usually made of aluminum, tin, or some other relatively good heat conducting material. Each of these methods has advantages as well as disadvantages.

The "corn meal" method generally has a faster cooking time since the cooking heat is more directly applied to the products. In addition, this method results in a more uniform browning of the bottom of the pizza dough, and it also allows the moisture in the dough to escape more easily thereby preventing undesirable bubbling and separation of the dough from the cooking surface. However, this method is very untidy and messy and results in considerable waste and requires much clean up. Furthermore, it is not possible to easily relocate a cooking pizza product in the oven while it is still in a raw or uncooked condition and until the crust has sufficiently hardened. Furthermore, re-arrangement of the products in the oven, in an effort to better utilize the total cooking capacity of the oven, often can not be accomplished without considerable damage to the products.

The "pan" method, on the other hand, overcomes many of the disadvantages of the "corn meal" method and allows for easy re-arrangement of the pizza products while still in an uncooked state. Nevertheless, the pan method likewise has several disadvantages. When utilizing the conventional "pan" method, the moisture content of the dough is not readily eliminated thereby causing undesirable bubbling and separation of the dough, the dough will often not brown and harden sufficiently and the dough will tend to stick to the cooking surface of the pan thereby making it difficult to remove the finished product without considerable damage. Products cooked in this way also have relatively uncooked portions which diminishes their tastiness.

Although both the "corn meal" and the "pan" methods are widely used for the baking of pizza type products, both methods have shortcomings and disadvantages as indicated which make them inefficient, costly, and wasteful.

The prior art discloses several pan constructions which have attempted to eliminate the disadvantages of the present methods for cooking pizza type products. U.S. Pat. No. 3,347,181 discloses a method for the making of pizza pies which uses a modified form of pizza platter having a perforated central load-carrying portion with diamond shaped apertures therein. The disclosure of this patent relates to the method of making pizza pies and not to a pizza pan construction.

U.S. Pat. No. 4,065,583 discloses another perforated pan construction of some interest. This patent discloses a multiple element pan construction comprising of a disposable cooking sheet made of a very thin flexible metal foil having a plurality of webs that extend across a perforated center section and a rigid open-bottom pan for supporting the foil sheet and an item of food thereon. This is substantially different from the present construction.

U.S. Pat. Nos. 254,770 and 1,021,640 and 3,347,181 disclose baking pan constructions utilizing perforated bottom portions. However, none of the patents disclose or suggest a pizza pan construction such as disclosed herein which is characterized by a substantially flat bottom portion having a uniform distribution of perforations with slightly filleted upper edges and wherein the ratio of the perforated surface area of the bottom portion of the cooking pan to the total surface area thereof is in the range from approximately 15 to 40 percent, and wherein the perforations are of a size from approximately ¼ to ⅜ inch diameter.

SUMMARY OF INVENTION

The present invention resides in a cooking pan having a relatively flat portion for positioning on an oven surface, which portion has a plurality of perforations uniformly distributed throughout the entire extent of the relatively flat portion of the cooking pan for directly exposing a substantial portion of the lower dough surface of a pizza type product to the cooking heat of the oven. The perforations have slightly rounded or filleted upper edges and are uniformly spaced and distributed over the entire flat portion of the pan, their size and shape preferably being constant throughout the entire extent thereof and the perforations are preferably round and of a diameter from approximately ¼ to ⅜ inch. The filleted upper edge portion of each perforation minimizes the concentration of heat on the product thereby reducing hot spots and uneven heating and also makes it easier to remove the products from the pan after being cooked. The size and shape of the perforations is also such that the product, when properly prepared, will not unduly sag into the perforations, and the distribution and spacing of the perforations is such as to provide uniform cooking and uniform dissipation of the moisture therefrom. The distribution pattern of the perforations is also such that the ratio of the perforated surface area of the bottom portion of the cooking pan to the total surface area thereof is in the range from approximately 15 to 40 percent.

With such a perforated pan construction, the advantages of both methods presently used for cooking pizza type products may be obtained, without any of the disadvantages. The specific relationship between filleted perforations and the ratio of the perforated surface area of the bottom portion of the pan to the total surface area therein produces accummulative effects which results in considerable cooking advantages and energy savings over prior art constructions.

The subject construction also produces relatively rapid elimination of moisture from the dough which substantially reduces the separation and bubbling affects of the dough and minimizes the sticking of the dough to the cooking surface of the pan. The present pan construction may also require lower cooking temperatures, shorter cooking times, and will more uniformly cook the products. Such a construction also has wide applications for use in oven cooking food products such as cookies, pies including pot pies and numerous other food products.

DETAILED DESCRIPTION

The novel invention disclosed and claimed herein is an improvement on the devices disclosed in the prior art and is characterized by a one-piece cooking pan wherein the substantially flat bottom portion of said pan has a plurality of perforations preferably filleted at the upper edge and uniformly distributed throughout the entire extent thereof such that the ratio of the perforated surface area of the bottom portion of the pan to the total surface therein is approximately 15 to 40 percent. The size or diameter of the perforations for best operation is also important.

It is therefore a principal object of the present invention to reduce the overall cooking time for the baking of pizza pies or like food products and to more uniformly cook such food products while directly exposing a substantial portion of the dough layer to the cooking heat of the oven.

Another object is to provide an improved perforated cooking pan wherein the upper edge portion of each perforation is slightly rounded or filleted.

Another object is to more uniformly cook pizza pies and numerous similar food products such as cookies, pies, including pot pies using lower cooking temperatures than are required when cooking such products in known pan constructions.

Another object is to more rapidly eliminate the moisture in dough during cooking thereby substantially reducing separation and bubbling effects in the dough.

Another object is to produce a relatively simple pan construction which can be economically produced for both commercial and non-commercial use.

Another object is to minimize the sticking of dough to the cooking surface of a pan.

Another object is to provide an easy to handle, light weight, reusable cooking pan construction for the baking of pizza pies or like food products.

Another object is to produce an improved cooking pan which cools relatively rapidly thereby making handling easier.

Another object is to provide an improved cooking pan which can be quickly and easily refilled with another food product in a minimum length of time.

Another object is to produce considerable savings in the energy required to cook or bake food products such as crusted food products.

Another object is to enable better and more efficient use of ovens for cooking pizza and like food products.

Another object is to obtain the advantages of exposing food products more directly to oven heat without requiring the use of granular substances.

Another object is to reduce the mess usually associated with cooking pizza type products.

These and other objects and advantages of the present invention will become apparent after considering the following detailed specification in conjunction with the accompanying drawings, wherein.

Figure 5:
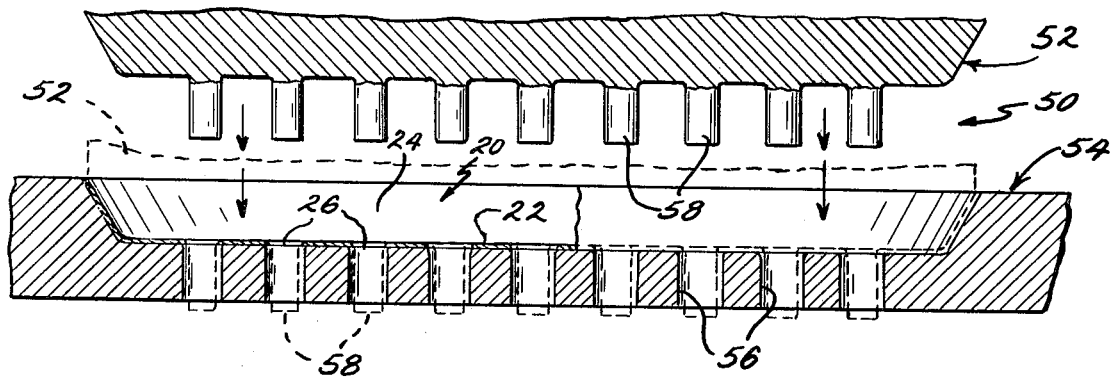
Figure 6:
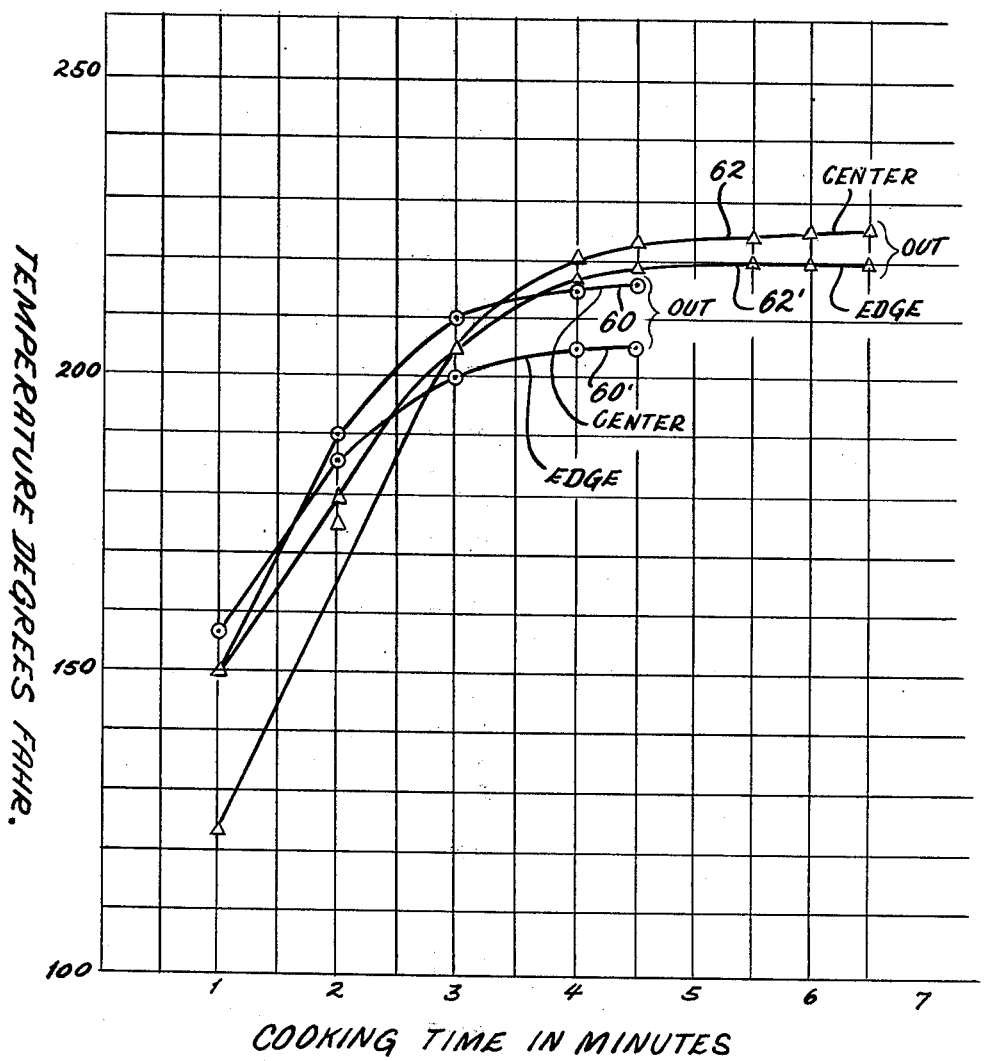

FIG. 5 is a fragmentary cross-sectional view showing a portion of a punch press of the type that can be used for punching the holes in the subject cooking pan, said view showing the press in inoperative position in solid outline and in operative position during a punching operation in dotted outline; and, FIG. 6 is a graph comparing the cooking time for the baking of pizza pies using the subject pan construction and using a standard pizza pan.

Figure 1:
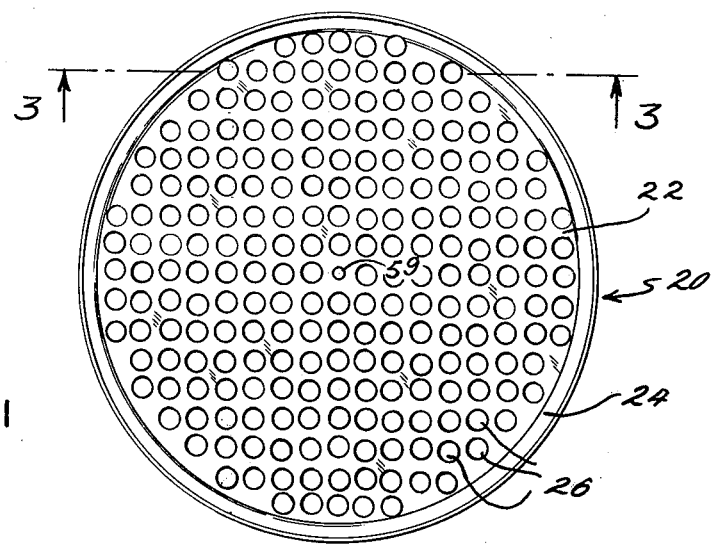
FIG. 1 is a top plan view of a pizza pan constructed according to the present invention.

Referring to the drawings more particularly by reference numbers wherein like numerals refer to like parts, in FIG. 1 the number 20 identifies a cooking pan such as a pan for cooking pizza pies and other similar type baked products. The pan 20 includes a relatively flat bottom wall portion 22 of predetermined size and shape and a peripheral portion or flange 24 extending upwardly at an angle or at a curved shape from the edge of said bottom wall portion 22 so as preferably to form a relatively smooth, rounded juncture or continuation 40 of the bottom wall as clearly shown in FIG. 3. The subject device is shown as being round but the principal feature of its construction can also be embodied on other shapes as well.

Figure 3:
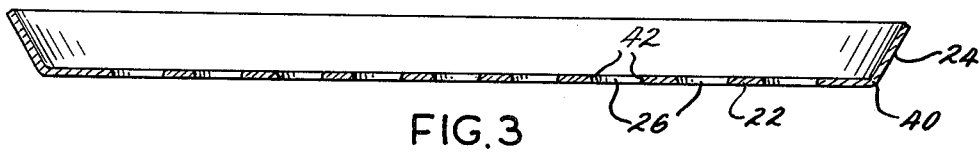
FIG. 3 is an enlarged cross-sectional view taken along line 3—3 of FIG. 1.
Figure 4:
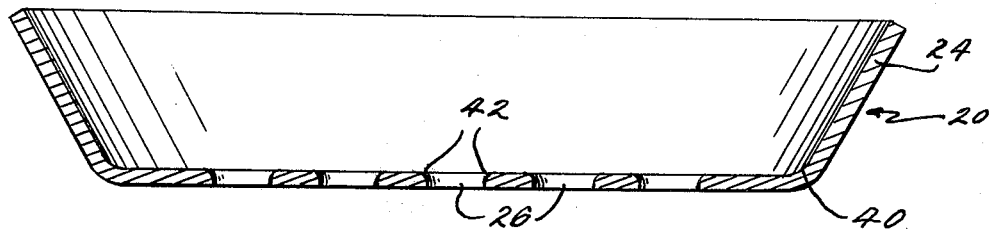
FIG. 4 is a further enlarged cross-sectional view taken on line 4—4 of FIG. 2.

The bottom wall portion 22 of the subject device 20 contains a plurality of perforations or holes 26 uniformly distributed over the entire extent thereof. The perforations 26 are shown as being round and each perforation is formed to have a filleted or rounded upper edge portion 42 as shown exaggerated in FIGS. 3 and 4. This feature is important for several reasons including to better distribute the exposed dough which covers the perforations to the oven heat and to reduce points of heat concentration which would otherwise result if sharper less rounded perforation edges were used. The fillets 42 also make it easier to remove the products after they have been cooked. The perforations 26 are distributed such that the ratio of the perforated surface area of the flat bottom portion 22 of the pan to the total surface area thereof is between approximately 15 to 40 percent. Although it is recognized that varying sizes and shapes of the perforations 26 such as circular, elliptical, oval, square and diamond shaped may be utilized, the ratio of perforated surface area to the total surface area of the bottom wall portion 22 of the pan 20 must remain within the allowed range of approximately 15 to 40 percent in order to produce the best results. By maintaining a uniform perforation distribution pattern that achieves this specified ratio relationship coupled with each of the perforations having a filleted or rounded upper edge portion 42 as shown in FIGS. 3 and 4, the moisture content in a dough or like product being cooked is more rapidly evaporated from the dough during the cooking thereby substantially reducing the overall cooking time for baking products such as pizza pies and other crusted food products. This rapid evaporation of the moisture through the perforations also substantially reduces the separation and bubbling effects on the dough and enables the dough to cook in a shorter period of time and at a lower cooking temperature as compared to prior art pan constructions.

The perforation pattern and ratio relationship also substantially reduces the possibility of the dough sticking to the cooking surface of pan 20, and more uniformly cooks pizza pies and other similar food products by directly exposing substantial portions of the lower dough surface to the cooking heat to the oven. By allowing a specific portion of the lower surface of the dough to be directly exposed to the cooking heat of the oven, the dough cooks faster and more evenly, thereby reducing the overall cooking time. By the same token, the subject device 20 also allows for rapid and uniform cooling of the overall pan and product after removal from the oven. This provides for easier handling and is important when repeated use of the same device is contemplated as in a commercial setting.

Although it is recognized that various metals and various metal thicknesses are available, it is preferred that the subject device 20 be constructed out of a well known and readily available aluminum alloys wherein the thickness is between approximately 0.040 and 0.063 inch as this range of thicknesses produces the best and most efficient conductivity of heat. Besides being an excellent conductor of heat, aluminum alloys are also considerably lighter in weight.

Aluminum alloys in this thickness range are also relatively sturdy and can withstand relatively rough handling without damage. A foil type construction is also possible utilizing metal as thin as approximately 0.015 inches. Although such thicknesses are not particularly suitable for commercial operations, the foil type construction may be suitable for home and other non-commercial uses where it is expected that such a device will be used a few times and then discarded.

Figure 2:
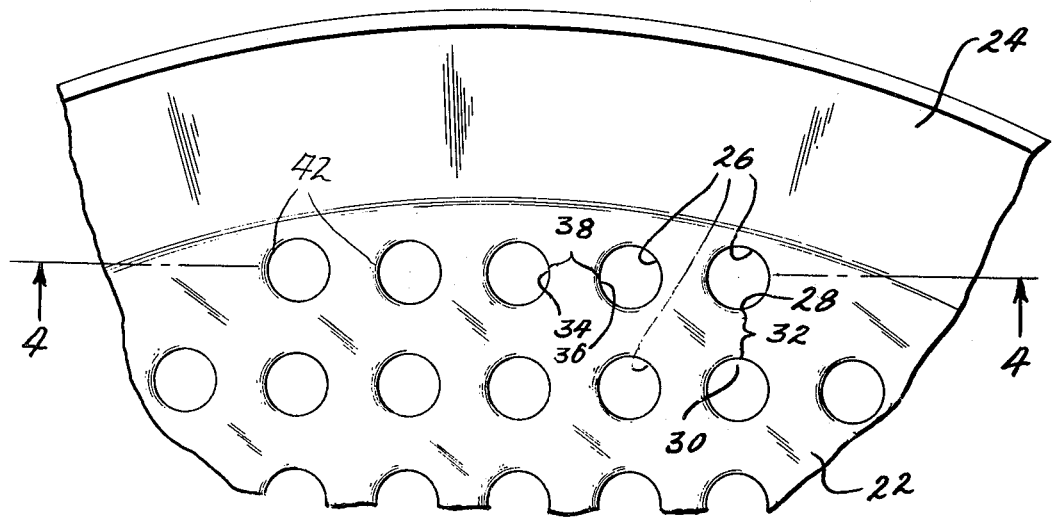
FIG. 2 is an enlarged fragmentary top plan view of the subject device showing use of a hole pattern distribution using round holes.

FIG. 2 is an enlarged fragmentary top plan view showing a preferred embodiment utilizing a uniform hole pattern distribution of round holes. Although various sizes and shapes of the perforations and various perforation distribution patterns may be utilized to produce the desired ratio relationship, this constant diameter circular hole pattern is preferred. It has been found by test that the selected hole diameter for best operation is between approximately one-quarter to three-eighths inch diameter depending upon the moisture content and dough consistency. In order to obtain the necessary browning affect of the finished product, the more moist doughs tend to require the smaller hole size in the range of a one-quarter inch diameter and even less while a drier dough consistency may be cooked on a pan having a hole diameter of three-eighths inch or even larger. If much less than a one-quarter inch hole diameter is used, however, the moisture content of the dough may not be eliminated in the required cooking time, and if greater than a three-eighths inch hole diameter is utilized, the doughs may not be properly supported during cooking, thereby producing a sagging effect of the dough in the holes with possible accompanying sticking of the dough to the pan. Hole diameters between one fourth and three eighths inch therefore are preferred and accommodate all known dough consistencies presently on the market.

Once the proper hole diameter has been determined within the allowable range based upon the moisture content of the dough, a uniform hole pattern distribution is selected as shown in the preferred embodiment of FIG. 2. In this embodiment the holes 26 are arranged in angularly related parallel rows and columns which extend substantially over the entire bottom portion 22, and depending upon the selected hole diameter and keeping the desired ratio of the perforated surface area of the bottom portion of the pan to the total surface area therein within the allowable range of approximately 15 to 40 percent, the distance between adjacent holes 26 in each row and column will be selected. For a hole diameter of one quarter inch ($\frac{1}{4}''$) the spacing between the holes will therefore be about $\frac{1}{4}''$ and for a three eighths inch ($\frac{3}{8}''$) diameter hole the spacing between the adjacent holes in the same row or column will also be about one-quarter inch. This distance is measured from the closest points on the adjacent holes. For example, the distance 38 is measured between the two closest points 34 and 36 on the adjacent holes shown in FIG. 2. The same spacing relationship exists between holes 26 arranged in angularly related parallel columns as evidenced by the distance 32 between the points 28 and 30. This particular hole pattern distribution produces the desired cooking condition.

The desirability of the particular diameter and the ratio of hole space to total space for achieving improved cooking results have been verified by experimentation. In one test identically prepared pizzas were cooked in the same oven, one using a standard 16 inch pizza pan and the other a cooking pan of the same size but of the improved construction. The improved pan contained 432 three-eighths inch diameter uniformly spaced holes in the sixteen inch circular bottom wall portion 22 of the pan. During the cooking process, the pizza in the improved pan had a total cooking time approximately two-thirds that of the similar product cooked in the standard pan. In addition, the pizza cooked in the improved pan was observed to be more evenly and uniformly cooked than the one prepared in the standard pan and was more easily removed from the pan. Both pizzas were cooked in a residential type electric oven preheated to 550° F. A notable difference in the products during cooking was also observed via the melting and bubbling of the cheese topping. In the improved cooking pan bubbling was observed to occur almost simultaneously across the whole top surface of the pizza while in the standard pan the cheese bubbling first occurred near the edge of the pan and gradually moved toward the center. A similar affect was also evident on the underneath side of the pizzas, the one cooked in the improved pan being more uniformly browned over its entire surface while the one cooked in the standard pan was much browner near the edge than at the center. The hole pattern distribution in the improved pan also substantially reduced sticking of the dough to the cooking surface while at the same time no detectable pan weakness was noted. In order to produce the most desireable cooking condition, however, the ratio of the area that was perforated to the total surface area was maintained between approximately 15 to 40 percent. This range of ratios reduced the overall cooking time while providing good support for the product and good pan strength.

In addition, the hole pattern distribution shown and the range of area ratios produced considerable energy savings over pans of more conventional constructions. In the tests it was demonstrated that the improved cooking pan utilized approximately 2900 BTU's during a particular cooking operation while a conventional non-perforated pan utilized approximately 3500 BTU's to cook a like product. Thus when using the present pan approximately thirty percent less energy was required.

FIG. 3 shows in detail the rounded shape of the juncture 40 formed between the peripheral portion 24 and the bottom wall portion 22 of the present pan 20. This enables the dough to be easily placed in the pan and also allows for easy cut off of excess dough and easy removal of the product after cooking. The rounded juncture 40 also allows the dough to rise and cook substantially free from sticking and makes for a consistent size pizza shell eliminating waste and allowing for more rapid handling and preparation.

The peripheral portion is not generally perforated, but this is not a disadvantage since the peripheral portion is usually the portion of the product that cooks fastest anyway. The peripheral portion 24 is shown extending upwardly from around the edge of the flat bottom wall portion 22 at approximately a 45 degree angle thereto. This angular relationship enables the dough to be rolled and stretched in an overlapping manner on the pan so that it may be cut off with a rolling pin. It is recognized that various other angular relationship between the bottom wall portion 22 and the peripheral portion can also be used with similar results. The rounded construction also facilitates sliding the devices into and out of the oven.

Reference numeral 42 designates the filleted or rounded upper edges of each of the holes or perforations 26. The fillets 42 can be formed during manufacturing process by punches that pass through the pan from the top. The greater the tolerance between the male and female die portions the greater will be the rounding or filleting. It has been found that the radius of curvature of the rounded upper edge or fillet of each hole for producing the best and most efficient results in approximately 1/128 inch radius although this can vary somewhat in both directions. The rounding of the upper edges of the holes also enables the oven heat below the pan to be distributed over a greater surface area of the dough in the pan, which is desireable, and without substantially reducing the pan support for the product during cooking. This is because the fillets eliminate the sharp edges which otherwise would tend to focus the heat along the upper hole edges thereby causing an uneven distribution of heat over the lower surface of the dough. In addition, the filleted upper edges of the holes 26 allow the dough to slide relatively freely onto and off of the upper surface of the wall portion 22, and substantially minimizes the possibility of the dough sticking to the pan during cooking.

FIG. 5 shows a tool for making the holes 26 in the subject pans, including filleting the upper edges of the holes 26. The uniform hole distribution pattern is obtained by placing an unperforated pan in a punch press 50 having male 52 and female 54 portions arranged and spaced in order to form the desired hole distribution pattern in the pan. The pan to be punched is positioned in the press on the female die portion 54 which has a plurality of die holes 56 therein in position to receive respective male die members or punches 58 on the male die portion 52. The desired number of holes are punched by moving the male die portion 52 downwardly against the top surface of the flat pan portion 22 forcing the male die members 58 therethrough into the holes 56 in the female die portion 54. This downward movement of the male die member 52 causes the punches 58 to perforate the pan from the upper surface thereof, and by selecting a desired clearance between the punches 58 and the respective female die holes 56, and a desired shape for the ends of the punches 58, the desired amount of filleting will occur. The shape of the male die member 52 where the punches 58 are attached can also be rounded to help form the fillets 42. The punching operation may also cause some burring of the lower ends of the holes 26, but this can be relatively easily removed as by repeated sliding of the subject pans into and out of an oven or by abrading after punching. The dotted outline of the male die member in FIG. 5 shows its position during a punching operation. It is also contemplated to construct the die to punch only a predetermined portion of a pan during each punching operation to reduce the cost by the required die. For example, the die could be made to punch a half, a quarter, a third or any other portion of a pan during each punching operation. Note also in FIG. 1, that the pan 20 is provided with a small hole 59 located at its center. The hole 59 is provided to help locate the pan on the female die member in preparation for a punching operation. Otherwise, the hole 59 serves no particular function and is optional.

It is recognized that other alternative methods for producing the fillets 42 are also available and possible including by drilling, countersinking, and routing the holes. Furthermore, the male die 52 and female die 54 may both be constructed to punch other shaped perforations besides round ones, such for example as elliptical, oval, diamond shaped, or square holes without departing from the spirit and scope of the invention. Other shaped perforations, however, are more difficult and expensive to produce and may require different hole spacing to maintain the most desire ratio of hole area to total area. It is also contemplated to make the die expandible so as to be used to punch different standard size pans.

FIG. 6 shows graphs of empirical data obtained by actual experimentation. The graph lines compare the cooking times required for baking pizza type products using the subject pan construction and a conventional non-perforated pizza pan. Two identically prepared pizzas were cooked simultaneously in the same oven at the same oven temperature using the different pans. A gas-fired, pizza oven was used during the tests and the data was obtained using two posistor-type probes each having a surface area of about one square centimeter. One such probe was pressed against the dough just inside the peripheral portion of the pan, and the other probe was pressed against the dough at or near the center of the pan. During cooking each pizza was observed through a glass oven door during which time readings were taken for the various posistor-type probes on each product. The temperature and other oven settings were not changed during the cooking process. In FIG. 6 are plots of the cooking temperatures of the two pizza as a function of the cooking time in minutes taken at the two locations on each pizza dough one cooked in the present pan and the other a conventional non-perforated pan. Graph line 60 is a plot of the actual dough temperature measured at or near the center of the pizza dough for the pizza cooked in the improved pan 20 having uniform perforations distributed over its flat surface portion 22 as shown in FIG. 2. Graph line 60' is a plot of the same dough temperature during the same time interval taken at a location adjacent to the edge of the same pizza dough. Note that this pizza was removed fully cooked from the oven after about four and one half minutes with the dough temperature at the center reaching a temperature of about 216° F. and at the edge about 206° F. Similarly, graph line 62 is a plot of the actual dough temperature measured at or near the center of the similar pizza dough product during cooking in a non-perforated or conventional pan of the same thickness. This dough for the same oven temperature reached a temperature of about 226° F. The graph line 62' is a plot of the dough temperature as measured adjacent to the edge of the same pizza cooked in the non-perforated pan. The dough cooked in the non-perforated pan reached a final temperature adjacent its edge at the completion of cooking of approximately 220° F.

The pizza cooked in the subject pan was found to be uniformly baked and ready for eating after only approximately 4.5 minutes, while the pizza cooked in the non-perforated pan was still not thoroughly and uniformly cooked after 6.5 minutes. The difference in overall cooking times is directly related to the rate of moisture evaporation. In the non-perforated pan, the dough moisture was not able to escape nearly as fast and in the case of the perforated pan, and this fact coupled with the fact that pizza topping materials also contained moisture, tended to cause the moisture to stay in the dough for a much longer time. It was also noted that within approximately one minute after the temperature at the edge and at the center stabilized that the moisture content of the pizza dough being cooked in the improved pan was boiled off through the perforations, resulting in the much lower cooking temperature and the shorter cooking time. Meanwhile, the temperature of the pizza dough in the non-perforated pan was continuing to rise when the other pizza was fully cooked and stabilized at much higher edge and center temperatures before this cooking process was completed. As a result, the non-perforated pan required higher cooking temperatures and a longer cooking time to complete. Thus, it was demonstrated that the subject pans are able to cook pizza products in approximately thirty-five percent less time than when using a conventional pan and to do so more uniformly and at lower cooking temperatures. Hence use of the present pan produces a considerable savings in the total energy consumed over that utilized by the standard pan. The shorter cooking time also greatly increases the efficiency of a place that serves pizza products. It is recognized however, that the cooking times and temperatures as set forth herein are for illustrative purposes only and will vary somewhat depending on the type of product being cooked, and the location of the pan in the oven. Nevertheless, the overall conclusions remain unchanged that the improved pan 20 has the advantages of requiring lower cooking temperatures, shorter cooking times, and produces more uniformly cooked products.

Thus, there has been shown and described an improved cooking pan especially for cooking or baking products such as pizza pies and the like, which pan fulfills all of the objects and advantages sought therefore. It will become apparent from this description, however, that many changes, modifications, variations, and other uses and applications for the subject construction, in addition to those that have been disclosed, are possible and contemplated. All such changes, modifications, variations and other uses and applications which do not depart from the spirit and scope of the invention are deemed to be covered by the invention which is limited only by the claims which follow.

What is claimed is:

1. An improved cooking pan for use in baking pizza pies and like crusted food products, said cooking pan being unitary in construction and comprising a substantially flat metal wall portion of predetermined size and shape, said wall portion being of a thickness of between approximately 0.040 and 0.063 inch and having opposed top and bottom surfaces, said wall portion having a plurality of perforations therethrough uniformly distributed throughout the entire extent thereof, wherein the ratio of the total perforated surface area of said wall portion to the total surface area thereof being between approximately 15 to 40 percent, each of said perforations having an upper edge that is filleted, said perforations being round holes arranged in angularly related rows and columns over said metal wall portion, the diameter of said holes being in a range from approximately one-fourth to three-eights inch, and a peripheral pan portion extending upwardly from around the wall portion at an angle thereto whereby the peripheral portion forms a continuation of the wall portion.

2. The pair of claim 1 made of alluminum alloy.

3. An improved one-piece cooking pan for use in baking pizza pies and like food products comprising a substantially flat metal bottom wall portion of a predetermined size and shape, said wall portion being of a thickness of between approximately 0.040 and 0.063 inch and having opposed top and bottom surfaces, said bottom wall portion having a plurality of round holes therethrough uniformly distributed over the entire extent thereof, the size and spacing of the holes being such that the ratio of the perforated surface area of said bottom wall portion to the total surface area thereof is between approximately 15 to 40 percent, all of the holes in said bottom wall portion being of the same size but being of a diameter from approximately one-quarter to three-eighths inch, said holes being arranged in angularly related parallel rows and columns extending over the bottom wall portion, each hole in each of said rows and columns being spaced from each adjacent hole in the same respective rows and columns a distance equal to approximately one-quarter inch, each of said holes having upper and lower edges adjacent respectively to the top and bottom surfaces, the upper edge of each hole being rounded, and a peripheral pan portion extending upwardly from around the bottom wall portion at wall portion.

4. The pan of claim 3 wherein the bottom wall portion is round.

5. The pan of claim 3 made of aluminum alloy.

6. The pan of claim 3 wherein said peripheral pan portion extends upwardly from around the bottom wall portion at approximately forty-five degrees.

* * * * *

UNITED STATES PATENT OFFICE
CERTIFICATE OF CORRECTION

Patent No. 4,176,591     Dated December 4, 1979

Inventor(s) Douglas P. Power

It is certified that error appears in the above-identified patent and that said Letters Patent are hereby corrected as shown below:

In claim 3, column 10, line 49, after the word "at" insert --an angle thereto to form a continuation of the bottom--.

Signed and Sealed this

Twenty-eighth Day of April 1981

[SEAL]

Attest:

Attesting Officer

RENE D. TEGTMEYER

Acting Commissioner of Patents and Trademarks